(12) United States Patent
Gehlhausen et al.

(10) Patent No.: US 10,530,411 B2
(45) Date of Patent: Jan. 7, 2020

(54) CARDHOLDER ACCESSORY FOR PORTABLE ELECTRONIC DEVICE

(71) Applicant: The Haus, LLC., Cicero, IN (US)

(72) Inventors: Caitlin Marie Gehlhausen, Cicero, IN (US); Michael A. Leagre, Fishers, IN (US)

(73) Assignee: The Haus, LLC, Cicero, IN (US)

( * ) Notice: Subject to any disclaimer, the term of this patent is extended or adjusted under 35 U.S.C. 154(b) by 0 days.

(21) Appl. No.: 16/292,522

(22) Filed: Mar. 5, 2019

(65) Prior Publication Data

US 2019/0280727 A1    Sep. 12, 2019

Related U.S. Application Data

(60) Provisional application No. 62/639,909, filed on Mar. 7, 2018.

(51) Int. Cl.
| | | |
|---|---|---|
| *H04B 1/00* | (2006.01) | |
| *H04B 1/3888* | (2015.01) | |
| *H04M 1/04* | (2006.01) | |
| *H04M 1/21* | (2006.01) | |
| *A45C 11/18* | (2006.01) | |
| *F16M 13/04* | (2006.01) | |
| *G06F 1/16* | (2006.01) | |
| *A45C 15/00* | (2006.01) | |
| *A45C 11/00* | (2006.01) | |
| *H04M 1/18* | (2006.01) | |

(52) U.S. Cl.
CPC .......... *H04B 1/3888* (2013.01); *A45C 11/182* (2013.01); *H04M 1/04* (2013.01); *H04M 1/21* (2013.01); *A45C 15/00* (2013.01); *A45C 2011/002* (2013.01); *F16M 13/04* (2013.01); *G06F 1/1656* (2013.01); *H04M 1/185* (2013.01)

(58) Field of Classification Search
CPC ....... H04B 1/3888; A45C 11/12; A45C 15/00; A45C 2011/002; H04M 1/04; H04M 1/21; H04M 1/185; F16M 13/04; G06F 1/1656
See application file for complete search history.

(56) References Cited

U.S. PATENT DOCUMENTS

| | | | |
|---|---|---|---|
| D653,656 S | 2/2012 | Charnas et al. | |
| D688,655 S | 8/2013 | Rey-Hipolito et al. | |
| 8,560,031 B2 * | 10/2013 | Barnett | F16M 13/00 455/575.8 |
| 8,989,826 B1 | 3/2015 | Connolly | |

(Continued)

FOREIGN PATENT DOCUMENTS

KR    2020140007757    10/2014

OTHER PUBLICATIONS www.bestbuy.com; PopSockets—Mount for Cell Phones with PopSocket—Black; Model 48370BBR.

(Continued)

*Primary Examiner* — Khai M Nguyen
(74) *Attorney, Agent, or Firm* — Dean McConnell IP Law

(57) ABSTRACT

An accessory for a portable electronic device which includes a housing having a base portion configured for attachment to a portable electronic device. The accessory further includes a grip socket retention channel at least partially defined by the housing, and the grip socket retention channel is configured to receive and removably retain a base of a grip socket.

16 Claims, 5 Drawing Sheets

(56) References Cited

U.S. PATENT DOCUMENTS

| | | |
|---|---|---|
| D750,056 S | 2/2016 | Lee |
| 9,894,192 B2 | 2/2018 | Cox, III |
| 2010/0230301 A1 | 9/2010 | Fellig |
| 2017/0026498 A1* | 1/2017 | Goldfain .............. A45C 11/182 |
| 2017/0208911 A1* | 7/2017 | Goldfain .............. A45C 11/182 |

OTHER PUBLICATIONS www.adcomarketing.com; Tuscany Card Holder with Metal Ring Phone Stand by Leeman; Item# TECH-029.

* cited by examiner

CARDHOLDER ACCESSORY FOR PORTABLE ELECTRONIC DEVICE

CROSS-REFERENCE TO RELATED APPLICATIONS

The present application claims the benefit of U.S. Provisional Patent Application No. 62/639,909, filed Mar. 7, 2018, the entirety of which is incorporated by reference herein.

BACKGROUND

The technical field generally relates to accessories for portable electronic devices. Portable electronic devices, such as smartphones and tablets have become integral to daily life. Over time, the screen size of these portable electronic devices has been increased to allow for a better user experience for a variety of activities including surfing the web, viewing and posting to social media, photo editing, and the like. The increased size of these devices, as well as certain activities routinely performed on these portable electronic devices (e.g. taking a selfie and certain gaming), has made it difficult for many users to maintain a proper grip on the electronic device.

A variety of devices have been created which aid in gripping of the electronic device. One such device is the extending socket disclosed in U.S. Pat. No. 8,560,031, presently sold under the trade name POPSOCKETS®. These extending sockets are fixedly attached to the back of a phone, or a case of the phone, through an adhesive. The use of such adhesive permits the use of the extending grip socket on a variety of devices; however, the addition of an extending grip socket increases the footprint of the electronic device, in some instances to a degree such that it will no longer fit into a pocket or small purse. Therefore, further technological developments are desirable in this area.

SUMMARY

One form of the present application includes an accessory cardholder with a card retention slot and a grip socket retention portion. Other embodiments include portable electronic device accessory apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
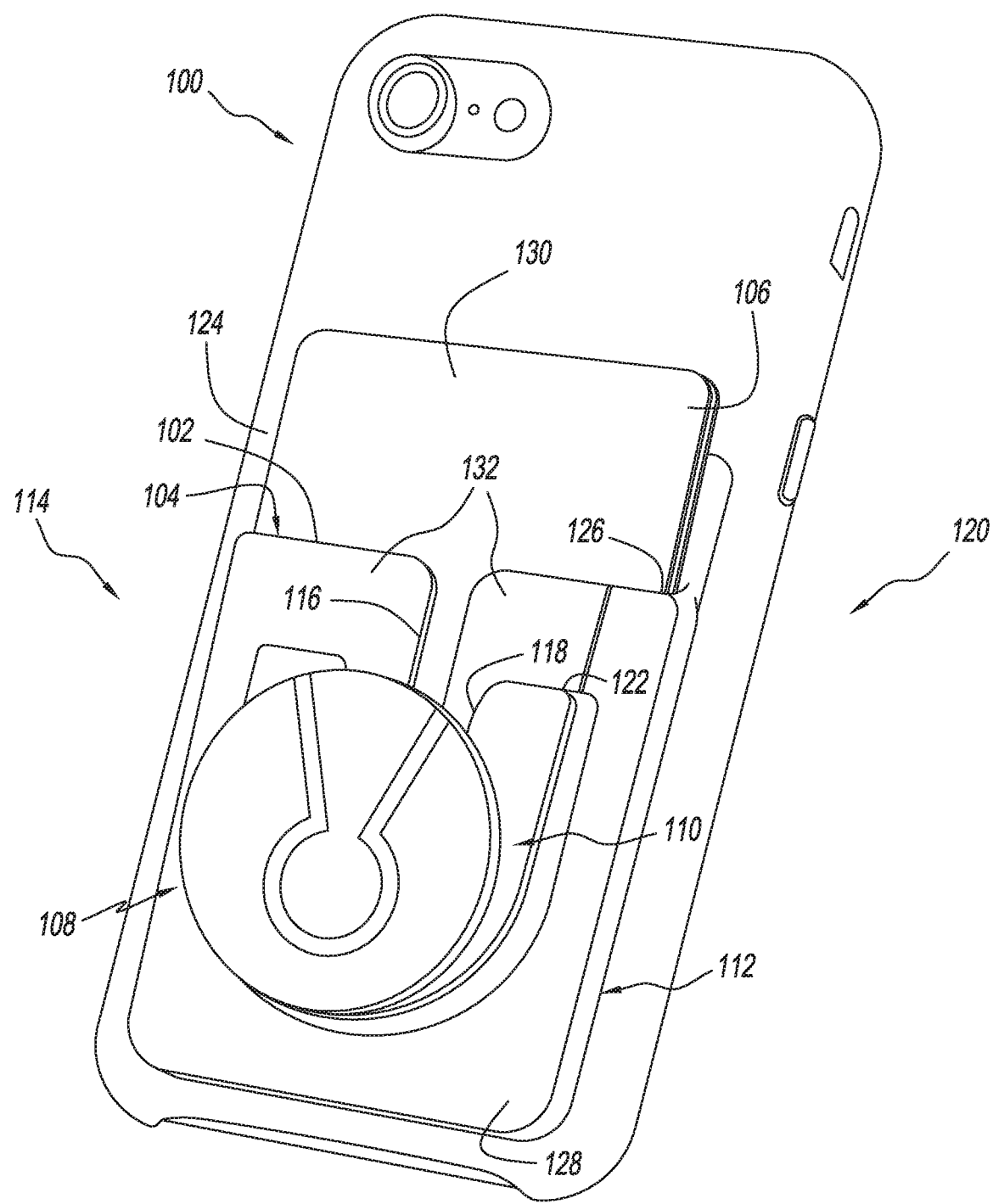
FIG. 1 depicts a perspective view of one form of an accessory cardholder mounted to a portable electronic device.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

The present application is directed to accessories for portable electronic devices. In one form, the accessory is a cardholder which includes a card retention slot and a grip socket retention portion that removably retains a grip socket such that the grip socket can be easily inserted and removed. Although the accessory is hereinafter discussed as being mounted to a smartphone, it should be understood that it is contemplated that the accessory can be mounted to a variety of portable electronic devices, including, but not limited to smartphones, tablets, portable music players, or the like. As utilized herein, the term "portable electronic device" is also intended to encompass any cases, sleeves, or protectors which may be attached on portable electronic devices. The term grip socket is intended to include a variety of grip sockets, which are also referred to as "phone grips", such class of grip sockets include, but are not limited to POPSOCKETS® brand grip sockets. The accessory cardholder can be an accessory wallet; however, the accessory cardholder can be modified to accept a variety of cards, not merely payment instruments.

Figure 2:
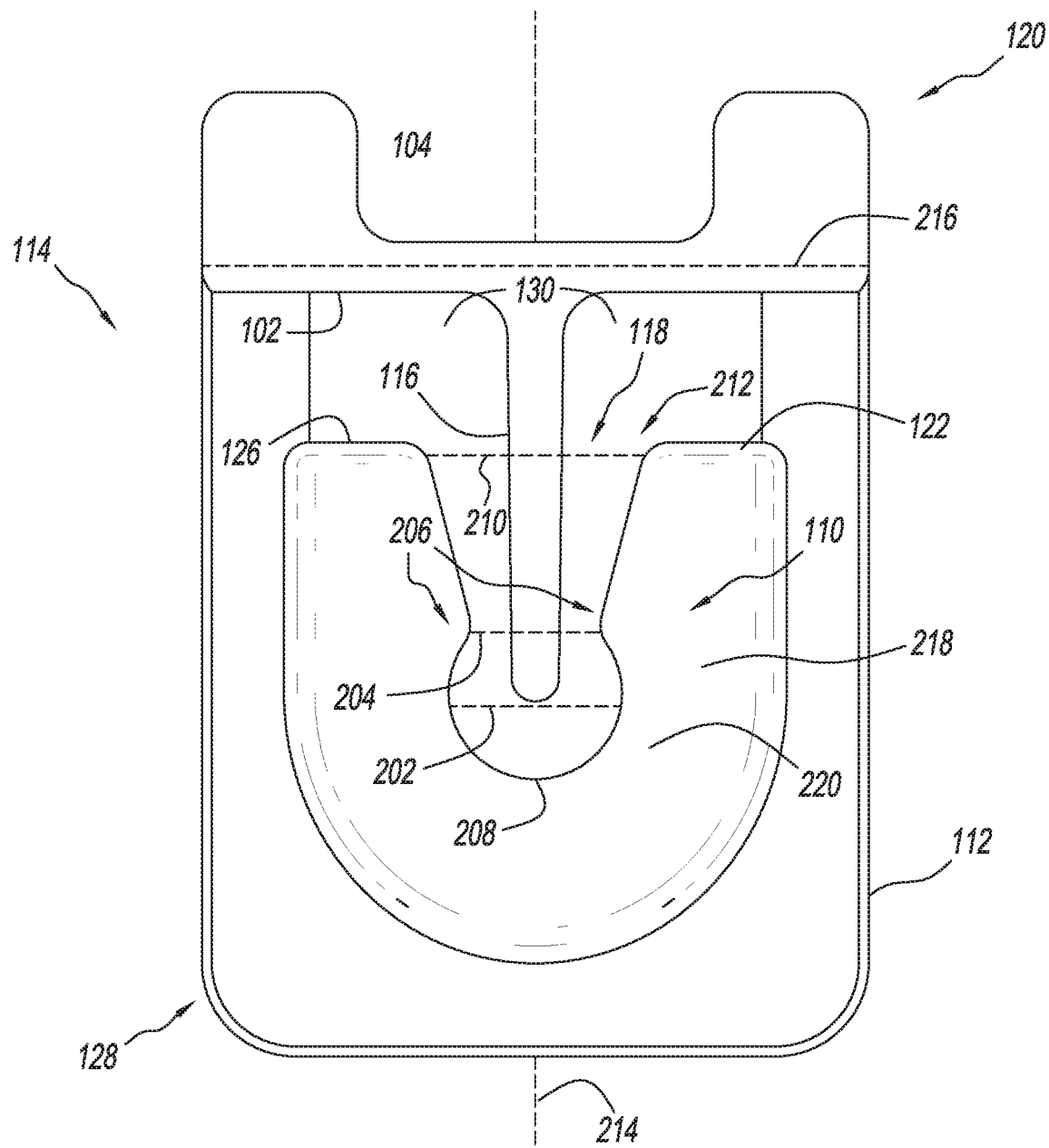
FIG. 2 depicts a top view of the accessory cardholder of FIG. 1.

FIGS. 1 and 2 depict a first form of an accessory cardholder 120. The accessory cardholder 120 includes a housing 114. As is illustrated, a base portion 112 of the housing 114 is attached to a smartphone 100 (in this case indirectly via smartphone case 124). The housing 114 of the accessory cardholder 120 includes a card retention slot 104 and a grip socket, retention portion 110.

The card retention slot 104 is configured to receive and retain a credit card 106, business card, license, student identification card, or the like. The card retention slot 104 extends internal to the housing 114 from an opening 102 defined in the housing 114 toward a distal end 128 of the housing 114. A width 216 of the card retention slot 104 can approximate the standard width dimension of a credit card 106 (e.g. 2.125 inches) and the length can be slightly less than the standard length dimension of credit card 106 (e.g. less than 3.375 inches) such that an upper portion 130 of the credit card 106 protrudes from the card retention slot 104 even when the credit card 106 is fully inserted into the card retention slot 104. However, as would be appreciated by a person of ordinary skill, the dimensions of the card retention slot 104 can vary depending upon the specific application and specific card types desired to be retained within the card retention slot 104. This protrusion of the credit card 106 from the card retention slot 104 permits the credit card 106 to be easily grasped, even when the card 106 is fully inserted into the card retention slot 104.

Figure 3:
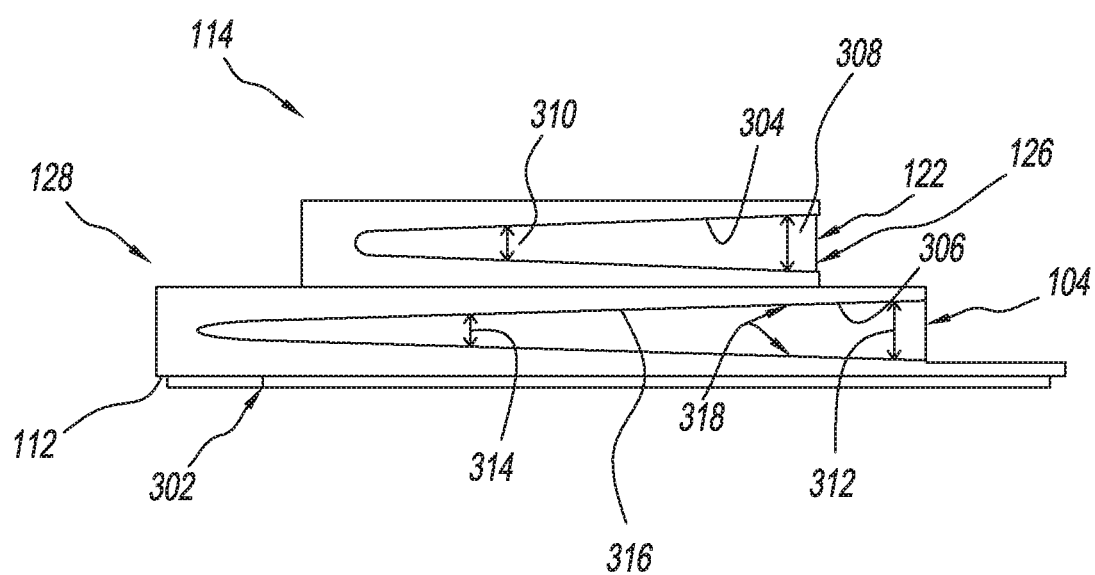
FIG. 3 depicts a side cutaway view of the accessory cardholder of FIG. 1.

The card retention slot 104 can retain the card 106 through an interference type fit. This interference type fit can be achieved in a variety of ways. For example, a width 216 of the card retention slot 104 can taper inwardly between the opening 102 of the card retention slot 104 and the distal end 128. As a non-limiting example of this taper, an opening 102 width 216 of the card slot 104 can approximate 2.25 inches and can taper to a width of approximately 2.10 inches toward the distal end 128. The card retention slot 104 can alternatively and/or additionally include a taper in depth (shown in FIG. 3). Referring now to FIG. 3, a side cutaway view of the housing 114 is depicted as would be seen along axis 214 of FIG. 2. As is illustrated in FIG. 3, an inner surface 306 of the card slot 104 can include a taper 216, which tapers inward between a first greater depth 312 (closer to the opening 102 of the card retention slot 104) and a second lesser depth 314 (closer to the distal end 128 of the housing 114). In this manner, when a card 106 is inserted into the card retention slot 104, opposing interior walls 318 and/or interior side walls (not shown) will press against the card 106 and retain the card in a manner sufficient to prevent the card 106 from unintentionally sliding from the card retention slot 104. For a user to extract a card 106 from the card retention slot 104, the user may grasp the upper portion 130 of the card 106 and pull the card 106 with sufficient force to overcome the interference type fit created within the card retention slot 104.

The card retention slot 104 can be configured to hold multiple cards. For example, the card retention slot 104 of FIGS. 1 and 2 is configured to receive and retain up to three cards 106. The ability to retain one, two, or three cards 106 is achieved with expansion slot 116, in addition to the previously discussed interference fittings. The expansion slot 116 permits card retention tabs 132 to move outwardly, and therefore expand the depth 312 of the card retention slot 104 to accommodate the cards 106. Although various aspects of the card retention slot 104 have been heretofore discussed with great specificity, including exemplary dimensions and number of cards 106 held therein, it is contemplated the dimensions of the card retention slot 104 can be varied depending upon the specific application as well as the type and number of cards desired to be stored therein.

The housing 114 includes a grip socket retention portion 110. The grip socket retention portion 110 receives and releasably retains a grip socket 108. As illustrated, the grip socket retention portion 110 can be located vertically above the card retention slot 104 such that the housing 114 of the accessory cardholder 120 has a smaller footprint than would be achieved if the card retention slot 104 and grip socket retention portion 110 were located side-by-side. In the embodiment depicted in FIGS. 1-4, the card retention slot 104 and the grip socket retention portion 110 extend in a plane which is substantially parallel to axis 214.

Figure 5:
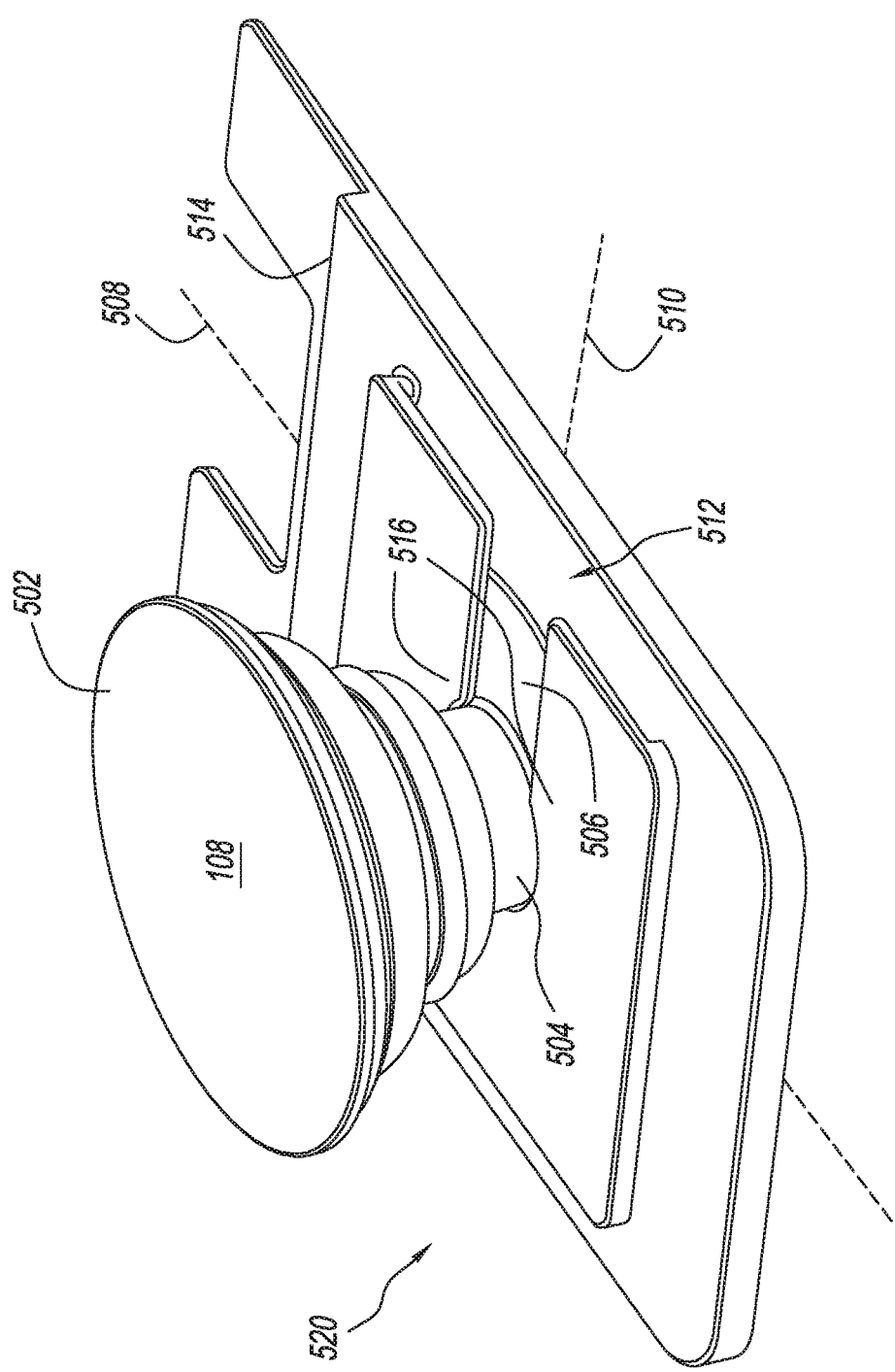
FIG. 5 depicts a further embodiment of an accessory cardholder.

The grip socket retention portion 110 permits a user to easily attach or remove a grip socket 108 to/from the accessory cardholder 120. Referring briefly to FIG. 5, the grip socket 108 includes a grip socket base 506, a shaft portion 504, and a handle portion 502. Referring back to FIGS. 1-3, the grip socket retention portion 110 includes a grip socket receiving channel 118 which extends inwardly from slot opening 126. The grip socket receiving channel 118 is structured to slidably receive the base portion 506 and the shaft portion 504 of the grip socket 108. The grip socket receiving channel 118 includes slot 122, which is configured to slidably receive the base portion 506 of the grip socket 108 therein. The slot 122 can include an interior width of approximately 1.5 inches, which is approximately equal to a diameter of the base portion 506 of a POPSOCKET® brand grip socket 108; however, other widths are contemplated herein to accommodate a variety of grip socket base widths and tolerance preferences.

The grip socket retention portion 110 further includes a shaft opening 212 located in an upper portion 218 of the housing 114. The shaft opening 212 includes a sufficient width 210 to permit the shaft 504 of the grip socket 108 to be inserted therethrough.

Shaft retention tabs 206 are configured to restrain the shaft 504 of the grip socket 108 when the grip socket 108 is inserted into the accessory cardholder 120. The shaft retention tabs 206 are depicted as extending inwardly into the shaft opening 212. The shaft retention tabs 206 can also define a portion of a terminus 208. The shaft retention tabs 206 can taper inwardly. The terminus 208 is depicted as being located toward an interior portion 220 of the grip socket retention portion 110. The shaft opening 212 and terminus 208 provide an opening through the upper portion 218 of the housing into the slot 122.

The terminus 208 can comprise a substantially circular shape. A diameter 202 of the substantially circular terminus 208 can be larger than a minimum width 204 between the opposing shaft retention tabs 206. The opposing shaft retention tabs 206 include some flex such that the shaft portion 504 of the grip socket 108, having a diameter larger than the minimum width 204, can pass through the opposing shaft retention tabs 206, but will experience resistance from the opposing tabs 206. In this manner, when the shaft 504 of the grip socket 108 is slid past the shaft retention tabs 206 and into the terminus 208, the shaft retention tabs 206 will press against the shaft 504 and prevent the shaft from unintentionally sliding out of the terminus 208 (e.g. the resistance provided by the shaft retention tabs 206 must be overcome before the shaft 504 can be removed from the terminus 208). The diameter 202 of the terminus 208 can approximate a diameter of the shaft portion 504 of the grip socket 108.

Figure 4:
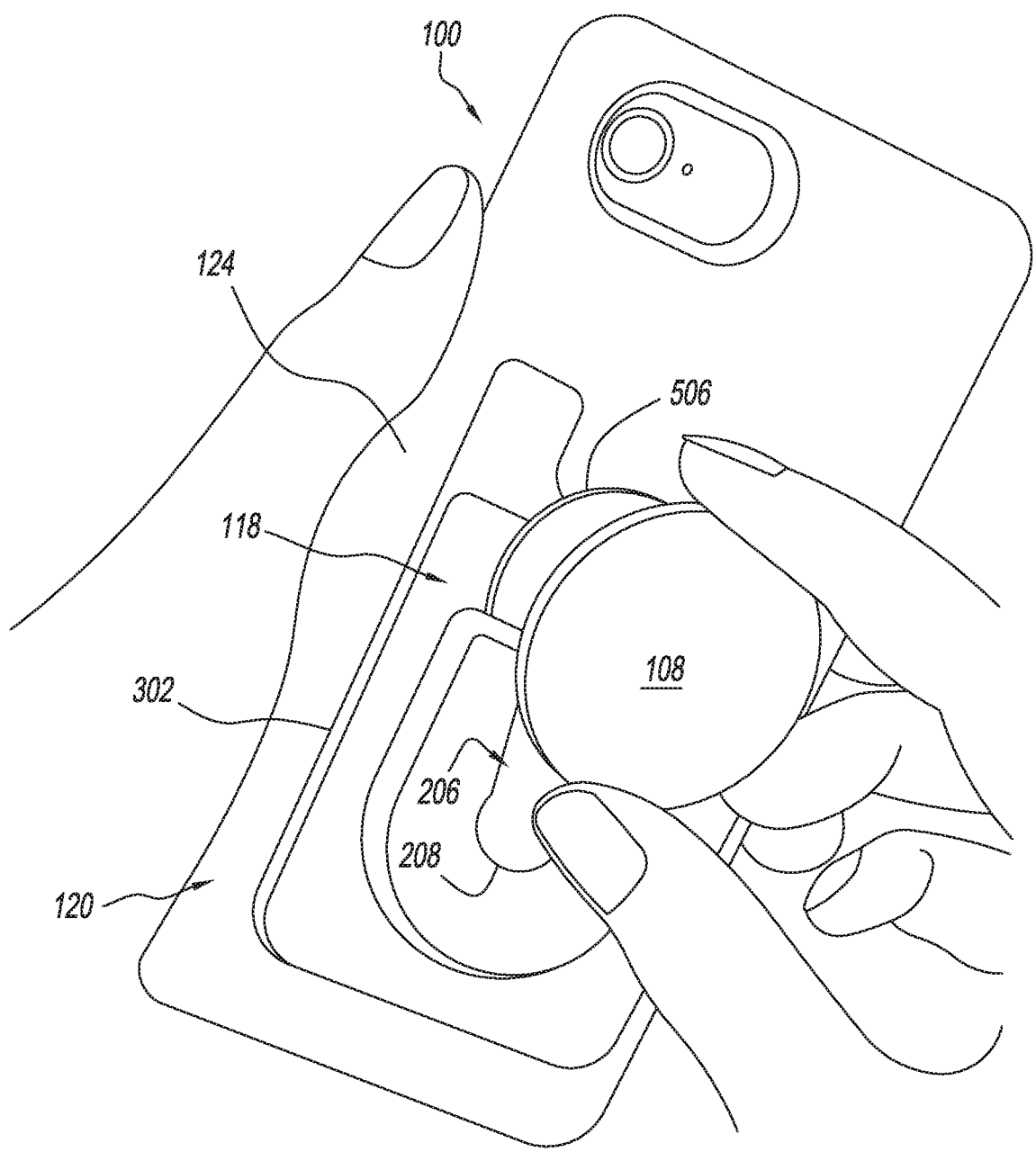
FIG. 4 depicts a perspective view of a grip socket being inserted into a grip socket retention portion of the accessory cardholder of FIG. 1.

The grip socket 108 can be slidably inserted into and slidably removed from the grip socket retention portion 110 of the housing 114. Referring to FIGS. 1 and 4, insertion and removal of a grip socket 108 from the accessory cardholder 120 will now be discussed.

To couple the grip socket 108 to the accessory cardholder, the grip socket 108 is inserted into the grip socket retention portion 110. This is accomplished by aligning the base portion of the grip socket with the slot opening 126. The base portion 506 is then inserted into the slot 122, under the upper portion 218 and under the opposing shaft retention tabs 206, toward the terminus 208 until the shaft portion 504 of the grip socket presses against the opposing shaft retention tabs 206. When the shaft portion 504 presses against the opposing shaft retention tabs, the base portion 506 is slid further into the slot 122 with sufficient force being exerted against the shaft portion 504 such that the shaft portion 504 overcomes the force exerted by the shaft retention tabs 206. When this force is overcome, the shaft portion 504 slides between the shaft retention tabs 206 until the shaft portion 504 is located within the semi-circular terminus 208. When the shaft portion 504 is located within the semi-circular terminus 208, the opposing shaft retention tabs 206 press against the shaft portion 504, and retain the shaft portion 504 within the semi-circular terminus 208.

In this manner, the grip socket 108 is mechanically retained within the circular terminus 208 by the opposing shaft retention tabs 206 of the channel 110, and sufficient force is provided by the opposing shaft retention tables 206 to prevent the shaft portion 504 from unintentionally slipping out of the terminus 208 when the grip socket 108 is utilized to manipulate the smartphone 100. The base 506 is prevented from lifting outwardly as the upper portion 218 of the housing retains the base 506 in the slot 122.

To remove the grip socket 108 from the accessory cardholder 120, a user will press the shaft, portion 504 toward slot opening 126 with sufficient force for the shaft portion 504 to overcome the force exerted by the opposing shaft retention tabs 206. When sufficient force is placed on the shaft portion 504, the shaft portion 504 will slide out of the terminus 208 and through the opposing shaft retention tabs 206. The base portion 506 slides outwardly, under the upper portion 218 and under the shaft retention tabs 206, toward the slot opening 126. Once the shaft portion 504 has been pushed or pulled through the shaft retention tabs 206, the shaft portion 504 faces no further resistance in being removed from the retention channel 118 and the base portion 506 can be easily slid out of the slot 122. In this manner, the accessory cardholder 120 of the present application permits a user to easily remove the grip socket 108, such as may be required to store the smartphone 100 into a small purse or pocket. The user can then easily reinsert the grip socket 108, when use of the grip socket 108 is desired. The user may also insert a different grip socket 108, which may include a different color, pattern, or texture (e.g. to coordinate better with an outfit, to better reflect the mood of a user, or the like).

Referring now to FIG. 3, the housing 114 is mounted to a smartphone 100 through adhesive portion 302. As would be understood by one of ordinary skill, the accessory cardholder 120 can be mounted to the smartphone case 124 or sleeve (not shown) of the smartphone 100 with equal effect (e.g. a user would still be able to hold and manipulate smartphone 100 with grip socket 108 whether the accessory cardholder 120 is mounted directly to the smartphone 100 or smartphone case 124). The adhesive portion 302 is depicted as, being mounted on a base portion 112 of the housing 114. In one exemplary form, the adhesive portion 302 is a peel-and-stick adhesive tape backing such as that manufactured by 3M. However, any adhesive portion 302 having strength sufficient to retain the housing 114 to the smartphone 100 during use of the grip socket 108 is contemplated herein.

In a further form, additional strength of coupling is provided between the base 506 of the grip socket 108 and the slot 122 through an interference fit, as were previously discussed with regard to the card slot 104. An interior surface 304 of the slot 122 tapers from a larger depth at 308, near the slot opening 126, to a smaller depth at 310 toward the distal end 128. In this manner, when the grip socket 108 base 506 is fully inserted into the slot 122, the interior surface 304 of the slot 122 presses against the base 506 and mechanically restrains the base 506.

The accessory cardholder 120 can be formed through polymer injection molding with inserts utilized to form the card retention slot 104 and the slot 122. The accessory cardholder can be molded of a low density resin, such as a low density polyethylene; however, a variety of polymers are contemplated herein which can provide flex sufficient for to the card retention tabs 132, the shaft retention tabs 206, and the interference fits to function. Production of the accessory cardholder can result in a unitary structure 114. For example, the card retention slot 104 and the grip socket retention portion 110 can be integrally formed with the housing in a single mold. As would be understood to a person of ordinary skill, the mold can include multiple inserts configured to define the grip socket retention portion 110 and the card retention slot 104. Additionally, injection molding can allow for the integration of a variety of textures and colors into the housing 114. However, it is contemplated that, the accessory cardholder 120 can be constructed through a variety of forming and shaping techniques, and be constructed of a variety of materials with sufficient flex, depending upon the specific design parameters for a given application.

FIG. 5 depicts a perspective view of a second form of an accessory cardholder 520. The primary differences between accessory cardholder 520 and accessory cardholder 120 are the orientation of the grip socket retention portion 512, the form of the shaft retention tabs 506, and the absence of a card expansion slot 116.

Similar to card slot 104, card slot 514 extends inwardly along a plane which is substantially parallel with axis 508. The grip socket retention portion 512 extends inwardly along a plane which is substantially parallel with axis 510, and is substantially perpendicular to axis 508. However, it is contemplated that card slot 514 can also extend inwardly along a plane which is substantially parallel with axis 510 in a manner such that the card slot 514 would extend inwardly from a side portion. In the form illustrated in FIG. 5, opposing shaft retention tabs 516 do not taper. Rather, shaft retention tabs 516 are depicted as extending in a substantially parallel fashion. In this manner, when the grip socket shaft 504 is to be inserted, sufficient force must be exerted to overcome the shaft retention tabs 516 force throughout insertion and removal, rather than at a single interference fit "choke point".

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An accessory for a portable electronic device, comprising:
   a housing including a base portion, wherein the base portion is configured for attachment to a portable electronic device;
   a grip socket retention channel at least partially defined by the housing, wherein the grip socket retention channel is configured to receive and removably retain a base of a grip socket;
   wherein the housing further includes a card slot configured to receive and removably retain at least a portion of a card therein;
   wherein an interior wall of the card slot includes an inwardly extending taper, and wherein the card is removably retained in the card slot through an interference fit; and wherein the grip socket retention channel includes a shaft terminus configured to receive and retain a shaft portion of the grip socket.

2. The accessory of claim 1, wherein a portion of the shaft terminus is partially defined by two inwardly extending tabs, wherein a channel width between the tabs is smaller than a diameter of the terminus, and wherein the inwardly extending tabs are structured to press against the shaft portion such that the shaft portion is removably retained within the terminus.

3. The accessory of claim 1, wherein the grip socket retention channel and card slot are integrally formed into the housing via injection molding of a low density polyethylene.

4. The accessory of claim 1, wherein the grip socket retention channel extends along a first axis, and wherein the card slot extends along a second axis substantially parallel to the first axis.

5. The accessory of claim 1, further comprising a peel-and-stick adhesive attached to the base portion and configured to couple the base portion of the housing to the portable electronic device.

6. An accessory cardholder for a portable electronic device, comprising:
   a housing including a card slot extending inwardly from a first surface of the housing, wherein the card slot is configured to receive and retain at least a portion of a card;
   a grip socket retention portion located in the housing, wherein the grip socket retention portion is configured to slidably receive and removably couple a portion of a grip socket therein;
   wherein a base portion of the housing includes an adhesive portion configured to adhere the housing to a portable electronic device; and
   wherein the grip socket retention portion further comprises a grip socket retention channel including a shaft terminus at least partially defined by a set of opposing inwardly extending tabs, wherein a channel width between the tabs is smaller than a diameter of the terminus, and wherein the inwardly extending tabs are configured to press against a shaft portion of the grip socket in a manner sufficient to removably retain the grip socket shaft in the shaft terminus;
   wherein the grip socket retention channel further includes a second slot configured to slidably receive a base portion of the grip socket therein; and
   wherein the grip socket retention channel extends along a first axis, and wherein the card slot extends along a second axis substantially perpendicular to the first axis.

7. The accessory cardholder of claim 6, wherein an interior surface of the card slot includes an inwardly extending taper, and wherein the card is retained in the card slot through an interference fit.

8. The accessory cardholder of claim 6, wherein the card slot and the grip socket retention portion are integrally molded into the housing through injection molding.

9. The accessory cardholder of claim 8, wherein the housing further comprises a low density resin.

10. The accessory cardholder of claim 6, wherein the adhesive portion further comprises a peel-and-stick adhesive, and wherein the adhesive portion is further configured to adhere the housing to at least one of a smartphone and a smartphone case.

11. An accessory cardholder for a smartphone, comprising:
   a housing defining a card retention slot therein, wherein the card retention slot is configured to receive and removably retain at least a portion of a card therein through an interference fit;
   an adhesive portion located on a base portion of the housing, wherein the adhesive portion is configured to adhere the base portion of the housing to a smartphone; and
   a grip socket retention channel defined by the housing, wherein the grip socket retention channel further includes a shaft terminus at least partially defined by a set of inwardly extending tabs, and wherein the tabs are configured to removably retain a shaft portion of a grip socket within the shaft terminus of the grip socket retention channel.

12. The accessory cardholder of claim 11, wherein an interior wall of the card retention slot includes an inward taper.

13. The accessory cardholder of claim 12, wherein the card retention slot and the grip socket retention channel are integrally formed into the housing via injection molding of a low density polyethylene.

14. The accessory cardholder of claim 11, wherein the grip socket retention channel further includes a second slot configured to slidably receive a base portion of the grip socket therein.

15. The accessory cardholder of claim 11, wherein the grip socket retention channel extends along a first axis, and wherein the card slot extends along a second axis substantially parallel to the first axis.

16. The accessory cardholder of claim 11, wherein the card slot further includes an expansion slot at least partially defined by opposing card retention tabs, and wherein the expansion slot allows for the insertion of multiple cards into the card slot.

\* \* \* \* \*